United States Patent
Breslin et al.

(10) Patent No.: US 6,908,271 B2
(45) Date of Patent: Jun. 21, 2005

(54) SPLIT LOCK SCREW FASTENER ASSEMBLY AND METHOD

(76) Inventors: Patrick W. Breslin, 11210 N. 67th Dr., Peoria, AZ (US) 85345; Mary A. Breslin, 11210 N. 67th Dr., Peoria, AZ (US) 85345

( * ) Notice: Subject to any disclaimer, the term of this patent is extended or adjusted under 35 U.S.C. 154(b) by 0 days.

(21) Appl. No.: 10/653,324

(22) Filed: Sep. 2, 2003

(65) Prior Publication Data

US 2004/0057810 A1 Mar. 25, 2004

Related U.S. Application Data

(60) Provisional application No. 60/412,358, filed on Sep. 21, 2002.

(51) Int. Cl.[7] .............................................. F16B 39/02
(52) U.S. Cl. ....................... 411/271; 411/325; 411/954; 411/57.1; 411/45
(58) Field of Search ................................ 411/325, 271, 411/954, 57.1, 60.1, 60.2, 44, 45, 55

(56) References Cited

U.S. PATENT DOCUMENTS

| | | | |
|---|---|---|---|
| 322,657 A | 7/1885 | Tolman | |
| 1,166,049 A | 12/1915 | Hyde | |
| 1,409,817 A | 3/1922 | Bilterman | |
| 2,381,050 A | * 8/1945 | Hardinge | 606/65 |
| 2,463,859 A | 3/1949 | Engstrom | 85/2 |
| 2,479,075 A | 8/1949 | Martin | 151/32 |
| 2,694,997 A | * 11/1954 | Alger, Jr. | 116/106 |
| 2,727,276 A | 12/1955 | Nelson | 18/15 |
| 3,042,094 A | 7/1962 | Liljeberg | 151/31 |
| 3,143,917 A | 8/1964 | Conner | 85/83 |
| 3,618,135 A | 11/1971 | Weller | 333/83 R |
| 4,044,647 A | 8/1977 | Takahashi | 85/72 |
| 4,976,577 A | 12/1990 | Brown et al. | 411/271 |
| 5,017,067 A | * 5/1991 | Ohlin | 411/45 |
| 5,219,254 A | 6/1993 | Ball, Sr. et al. | 411/271 |
| 5,221,167 A | * 6/1993 | Girkin et al. | 411/45 |

* cited by examiner

Primary Examiner—Flemming Saether
(74) Attorney, Agent, or Firm—Cahill, von Hellens & Glazer P.L.C.

(57) ABSTRACT

A self-locking bolt assembly (1) includes a split bolt (2) and a screw set pin (3). The bolt includes a threaded shank (4), an axial bore (6) extending through the shank, the bore (6) including a threaded bore section (6A), a tapered end section (6C), and a bore midsection (6B) between the threaded bore section and the tapered end section. The screw set pin(3) includes a screw section (10B) having threads for engaging the threaded bore section (6A) and a pin shaft (10) having a tapered end section (10A) for engaging the tapered end section (6C) of the bore (6), the pin shaft (10) having a proximal end attached to the screw section (10B). The pin shaft (10) is sufficiently long to ensure that the screw set pin (3) further into the bore (6) without galling threads of the screw section (10B). The tapered end section (10A) of the pin shaft has a taper angle ($\alpha$) that is less than a taper angle ($\beta$) of the tapered end section (6C) of the bore (6) to allow a narrowed end portion of the tapered end section (10A) of the pin shaft (10) to engage a narrowed end portion of the tapered end section (6C) of the bore (6).

14 Claims, 4 Drawing Sheets

SPLIT LOCK SCREW FASTENER ASSEMBLY AND METHOD

This application claims the benefit of prior filed co-pending U.S. provisional application Ser. No. 60/412,358 filed Sep. 21, 2002 entitled "SPLIT LOCK SCREW FASTENER ASSEMBLY" by Patrick William Breslin and Mary Ann Breslin.

BACKGROUND OF THE INVENTION

The present invention relates generally to a screw locking assembly including a hollow split stud or split bolt and a screw set-pin that is tightened into the hollow split bolt to lock it tightly into a hole or threaded hole in a medial body. More particularly, the present invention relates to improvements that greatly increase the mechanical advantage between torque applied to the pin setscrew and expansion of a split distal end portion of the bolt and to preventing loosening of the pin setscrew with respect to the split bolt and to preventing loosening of the split bolt with respect to the bolt-receiving hole without galling and causing injury to the threads of either the bolt bore or the pin setscrew as in the prior art.

The closest prior art is believed to include U.S. Pat. No. 322,657 entitled "Screw Bolt Lock" issued to Tolman on Jul. 21, 1885, U.S. Pat. No. 2,463,859 entitled "Threaded Locking Device" issued Jul. 25, 1945 to Engstrom, and U.S. Pat. No. 2,479,075 entitled "Screw Locking Means" issued to Martin on Nov. 24, 1944.

U.S. Pat. No. 322,657 discloses a screw bolt lock including a screw bolt A with a threaded central aperture C having a tapered section E and accommodating a screw or center pin F that spreads a slitted end section D of the bolt apart to lock the bolt into a threaded hole. As shown in FIG. 1 of U.S. Pat. No. 322,657, the center pin F is threaded up to the tapered section E of the bolt bore. The bolt bore is threaded to the point at which the distal end of the bore becomes tapered.

Similarly, U.S. Pat. No. 2,479,075 discloses a device in which a screw 11 having a bore 14 with slits 13 accepts a threaded plug 21 having a conical end taper 19 conforming to a tapered end section 17 of the bore. The tightening of the threaded plug is described as causing the conical end taper of the threaded plug to engage the tapered bore section 17, thereby expanding the slitted end of the screw 11 and locking it into a threaded hole of a body. U.S. Pat. No. 2,463,859 discloses another similar device in which a bolt has a partially threaded bore 4 that extends from the head of the bolt to a distal end portion thereof. Slits 8 are formed in the distal end portion of the bolt. A threaded expander stud 9 is threaded into bolt bore 4 to the end of the threaded portion. Further tightening of the stud causes it to engage a reduced diameter distal portion of the bore 4, causing expansion of the slitted distal end of the bolt, thereby locking the slitted distal end into a threaded hole.

The devices disclosed in the above described references have the shortcoming that the pin setscrews disclosed in the above references "bottom out" or "heel" on the lead-in threads of the bolt bore before the tapered distal end section of the pin setscrew reaches the tapered section of the bolt bore. The tapered distal end of the pin setscrew never comes in contact with the tapered section of the inner bore of the bolt because of the commonly known lead-in threads, required on all tapped blind holes, which bind the pin in the lead-in threads before it can reach the tapered section of the inner bore of the bolt. Tightening of the center pin, referred to herein as the "pin setscrew", in order to advance its distal threaded section sufficiently further into the unthreaded section of the bolt bore to spread the distal end of the bolt would cause the threads of the pin setscrew to gall on the threads of the bolt and cause strain and injury to the threads of both the pin setscrew and the bolt such that neither would be reusable, as recognized in the Tolman patent. (The term "galling" refers to a severe form of adhesive way or that occurs during sliding contact of one surface relative to another, wherein clumps of one part may break away from one surface and stick to the other surface.) Such galling would necessitate that an extremely large amount of torque be applied to the pin setscrew to advance it into the reduced-diameter portion of the bolt bore. Also, there would be inadequate mechanical advantage of torque applied between the bolt end of the pin setscrew to advance the pin setscrew so as to develop sufficient outward force on the split distal end sections of the bolt to expand them and adequately lock the bolt into the bolt-receiving hole. It would not be practical for the user to apply enough force to the pin setscrew to spread the distal split end of the bolt enough to cause an adequate locking effect, and the force would not be equally applied to all fingers to spread the bolt because of the diminishing root depth of the lead in threads of the bolt bore screw section as the pin setscrew is turned. Furthermore, the prior art does not provide any way of locking the pin setscrew to the bolt into when it is screwed into the bolt.

Despite the efforts in the prior art, there has been a very long and unfulfilled need for a practical, highly reliable self-locking bolt. For more than 200 years there has been a need for a locking fastener that is simple to use without use of parts that need to be assembled while installing and locking the fastener. An example of an application in which there has been a very long felt need for a reliable self-locking bolt is in the field of high-performance internal combustion engines, wherein exhaust manifold bolts frequently become loosened due to vibration and thermal cycling. No really reliable solution to this problem has ever been provided. There also are numerous other examples in which there has been a long felt need for a reliable self-locking bolt, including engine oil pump mounting applications, industrial press brake tool attachment applications, mining wheel and hub attachment applications, railroad track attachment applications, and many more.

There also is an unmet need for a simple true locking fastener that surpasses the IFI-124 and MIL-DTL-18240F specifications wherein the bolt and pin assembly securely locks, does not unlock under vibration or heat stress, and is not torque-dependent.

SUMMARY OF THE INVENTION

It is an object of the invention to provide a locking split bolt and screw set pin assembly that avoids galling of threads of the screw set pin into threads of a bore extending through the split bolt without strain and injury to the threads of either the bolt or screw set pin.

It is another object of the invention to provide a locking split bolt and screw set pin assembly that provides minimum frictional resistance to tightening of the screw set pin into a bore extending through the split bolt.

It is another object of the invention to provide a locking split bolt and screw set pin assembly that provides maximum mechanical advantage for tightening of the screw set pin into a bore extending through the split bolt to expand a threaded split distal portion of the bolt against threads of a receiving hole into which the bolt has been tightened and to lock the threads of the split bolt into place in the receiving hole.

It is another object of the invention to provide a locking split bolt and screw set pin assembly that provides maximum mechanical advantage for tightening of the screw set pin into a bore extending through the split bolt to expand a threaded split distal end portion of the bolt against threads of a receiving hole into which the bolt has been tightened to lock the bolt and screw set pin into place in the receiving hole and that also prevents loosening of the bolt and screw set pin due to various conditions, such as mechanical vibration and/or thermal cycling of a body in which the receiving hole is formed.

It is another object of the invention to provide a true locking fastener that meets or surpasses the IFI-124 and MIL-DTL-18240F specifications.

It is another object of the invention to provide a true locking screw set pin in a locking fastener including a hollow split stud or bolt.

It is another object of the invention to provide a locking fastener including a hollow split bolt and a screw set pin which can be reusable.

It is another object of invention to provide a true locking fastener that is easy to install without use of complicating components or accessories.

It is another object of invention to provide a true locking fastener that is in completely assembled form prior to use as a locking fastener.

It is another object of invention to provide a locking fastener including a split bolt wherein the degree of locking is not dependent on the amount of torque applied to the split bolt.

It is another object of the invention to provide a mechanical locking fastener with an internal locking mechanism.

It is another object of the invention to provide a locking fastener including a split bolt wherein the split bolt has maximum tensile strength.

It is another object of the invention to provide a locking fastener including a split bolt wherein an internal locking mechanism spreads split finger portions of the bolt symmetrically.

Briefly described, and in accordance with one embodiment, the present invention provides a self-locking bolt assembly (1) including a bolt (2) including a threaded shank (4), an axial bore (6) extending through the shank, the bore (6) including a threaded bore section (6A), a tapered end section (6C), and a bore midsection (6B) between the threaded bore section and the tapered end section and a screw set pin (3) including a screw section (10B) having threads for engaging the threaded bore section (6A) and a pin shaft (10) having a tapered end section (10A) for engaging the tapered end section (6C) of the bore (6), the pin shaft (10) having a proximal end attached to the screw section (10B). The pin shaft (10) is sufficiently long to ensure that when the tapered distal end section (10A) engages the tapered end section (6C) of the bore the screw set pin (3) then can be screwed a predetermined distance further into the bore (6) without galling threads of the screw section (10B) and threaded bore section (6A). The tapered end section (10A) of the pin shaft (10) has a taper angle (α) that is less than a taper angle (β) of the tapered end section (6C) of the bore (6) to allow a narrowed end portion of the tapered end section (10A) of the pin shaft (10) to engage a narrowed end portion of the tapered end section (6C) of the bore (6).

In the described embodiments, a plurality of slits (7) extend through a distal end section (20) of the shank (4) that includes the tapered end section (6C) of the bore (6). The pin shaft (10) has a diameter that is less than a diameter of the threaded bore section (6A) to allow the pin shaft (10) to pass through the threaded bore section without engaging threads thereof. The self-locking bolt assembly of claim 1 is screwed into a body (15) having a threaded bolt-receiving hole (15A) therein, with the screw set pin (3) tightened sufficiently into the bolt (2) to cause the tapered end section (10A) of the pin shaft (10) to expand a distal end section (20) of the shank (4) enough that threads (4A) of the shank tightly engage threads of the bolt-receiving hole (15A) and become locked into the body (15). The screw set pin (3) is also tightened sufficiently into the bolt (2) to cause the tapered end section (10A) of the pin shaft (10) to sufficiently symmetrically expand bolt fingers defined by the slits that central contact areas (C) of the fingers elastically deform and dig into the bolt-receiving hole (15A) enough to securely lock the bolt (2) to the body (15). The bore of the bolt is provided in such away as to create a differential in the radius of the internal tapered bore compared to the radius of the tapered end of the screw set pin, where the differential in the radius creates localized high-pressure points of contact between the internal tapered bore and the tapered end of the screw set pin without requiring a great deal of torque on the screw set pin to effectively lock it relative to the bolt and in order to effectively lock the bolt into a bolt-receiving hole.

DETAILED DESCRIPTION OF THE PREFERRED EMBODIMENTS

Figure 1:
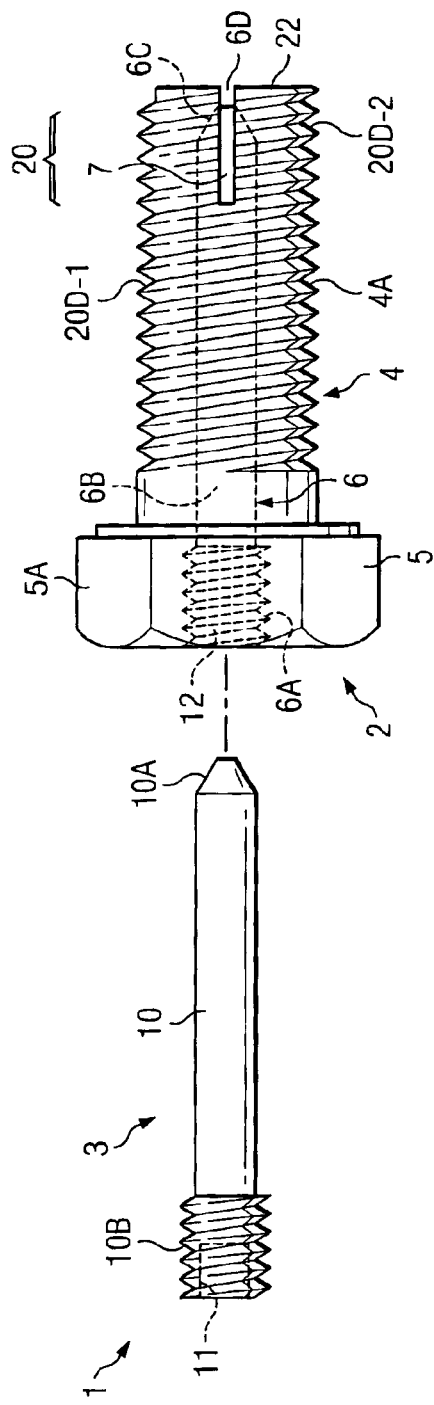
FIG. 1 is an exploded, partial cutaway side elevation view of a hollow split bolt and screw set pin assembly of the present invention.
Figure 3:
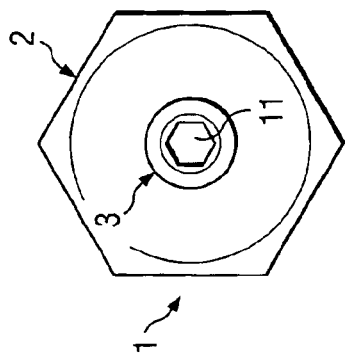
FIG. 3 is a left elevation view of the assembly shown in FIG. 1 with the screw set pin in the bore of the split bolt.
Figure 2:
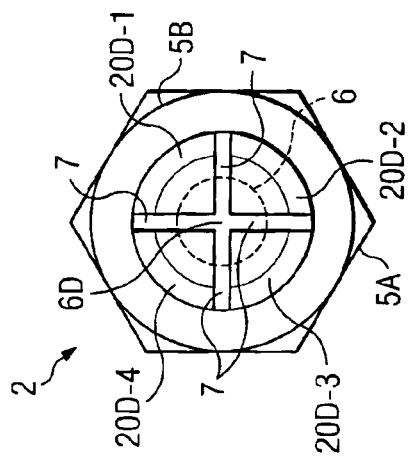
FIG. 2 is a left elevation view of the split bolt portion of the assembly shown in FIG. 1.
Figure 4:
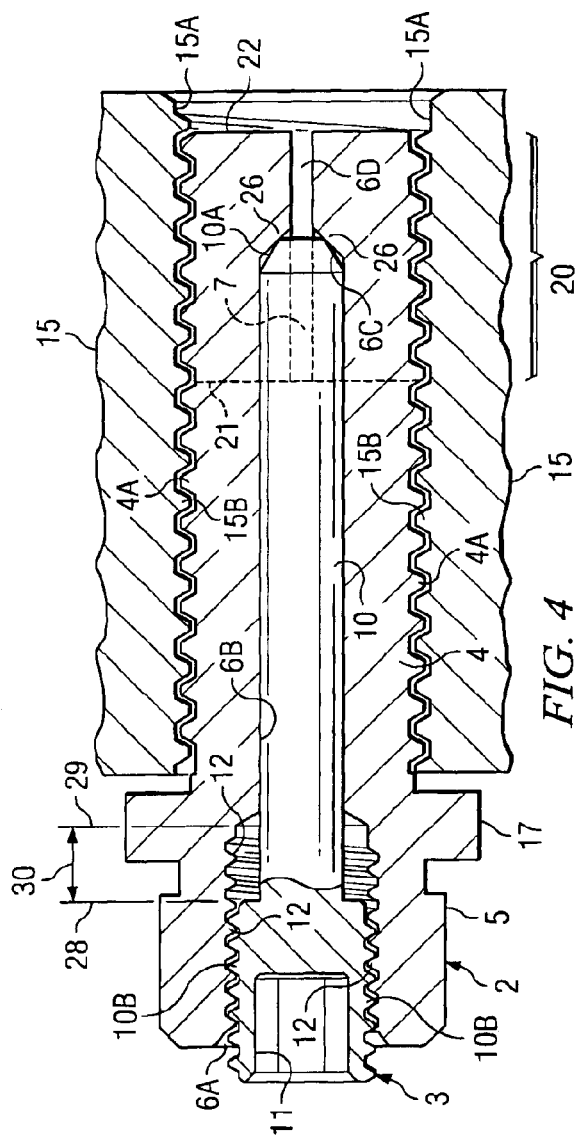
FIG. 4 is a section view of the assembly of FIG. 1 with the split bolt threaded into a receiving hole and the screw set pin threaded into the bore of the split bolt.

Referring to FIGS. 1–3, a split bolt and screw set pin assembly 1 includes a hollow split bolt 2 having an axial bolt bore indicated by hidden dashed line 6 and a screw set pin 3 which can be inserted into and tightened into bolt bore 6. Split bolt 2 includes an ordinary bolt head 5 having facets 5A for engagement by a wrench or the like, and also includes a threaded shank 4 through which bolt bore 6 extends. (An annular clamping flange 17 as shown in FIG. 4 can be included as part of bolt head 5.) Shank 4 includes conventional threads 4A on its cylindrical outer surface. A distal end portion 20 of split bolt 2 includes one or more slits 7 to allow expansion of the distal end portion 20 by screw set pin 3, as subsequently explained. Typically, there may be 4 to 8 slits, depending on the size of the fastener.

Bolt bore 6 includes, from left to right, a proximal cylindrical threaded section 6A having internal threads 12, a cylindrical reduced-diameter midsection 6B continuous with threaded section 6A, a conically tapered section 6C continuous with mid-section 6B, and a distal further-reduced-diameter end section 6D that is formed by the slits 7 and is continuous with tapered section 6C and extends to the end of shank 4.

By way of definition, the term "bolt" as used herein includes a threaded shaft and an ordinary bolt head or any other feature attached to bore included in the shaft that enables work to be applied to the shaft to advance it or thread it into a threaded bolt-receiving hole. Note that the self-locking feature of the invention can be provided for a self-tapping bolt or screw, and also can be provided for a wide range of sizes of bolts, studs, and screws.

Screw set pin 3, includes an elongated cylindrical pin section 10 which fits easily into midsection 6B of bolt bore 6 and a conically tapered distal end section 10A having a "shallower" taper angle than the taper angle of bolt bore section 6C. Pin section 10 of screw set pin 3 may have a minimum suitable diameter, which allows use of a minimum diameter of the bore mid-section 6B in order to provide maximum strength of bolt shank 4. A section 10B of screw set pin 3 is attached to the proximal end of pin section 10, and in the embodiment shown in FIG. 1, includes a hex key opening 11 for receiving a hex key with which to tighten screw set pin 3 into bolt bore 6. Of course, various other ways, such as providing a specialized head or handle, could be provided for engaging section 10B to tighten it using tools other than a hex wrench. Similarly, the head of split bolt 2 can be adapted to have a handle, and screw set pin 3 also can be adapted to have a handle. Split bolt 2 can be composed of the various materials of which ordinary bolts, screws, and studs are commonly composed for various applications, and screw set pin 3 also can be composed of the same materials of which ordinary set screws are commonly composed for various applications.

By way of definition, the head of split bolt 2 can be adapted to include features, such as one or more annular flanges, to engage or "capture" any type of auxiliary member (not shown) that is spaced from the body 15 into which the distal section 20 of shank 4 is threaded, and screw set pin 3 can be loosened to allow split bolt 2 to be suitably adjusted relative to body 2 so as to support the auxiliary member at any suitable distance from body 2.

Figure 5:
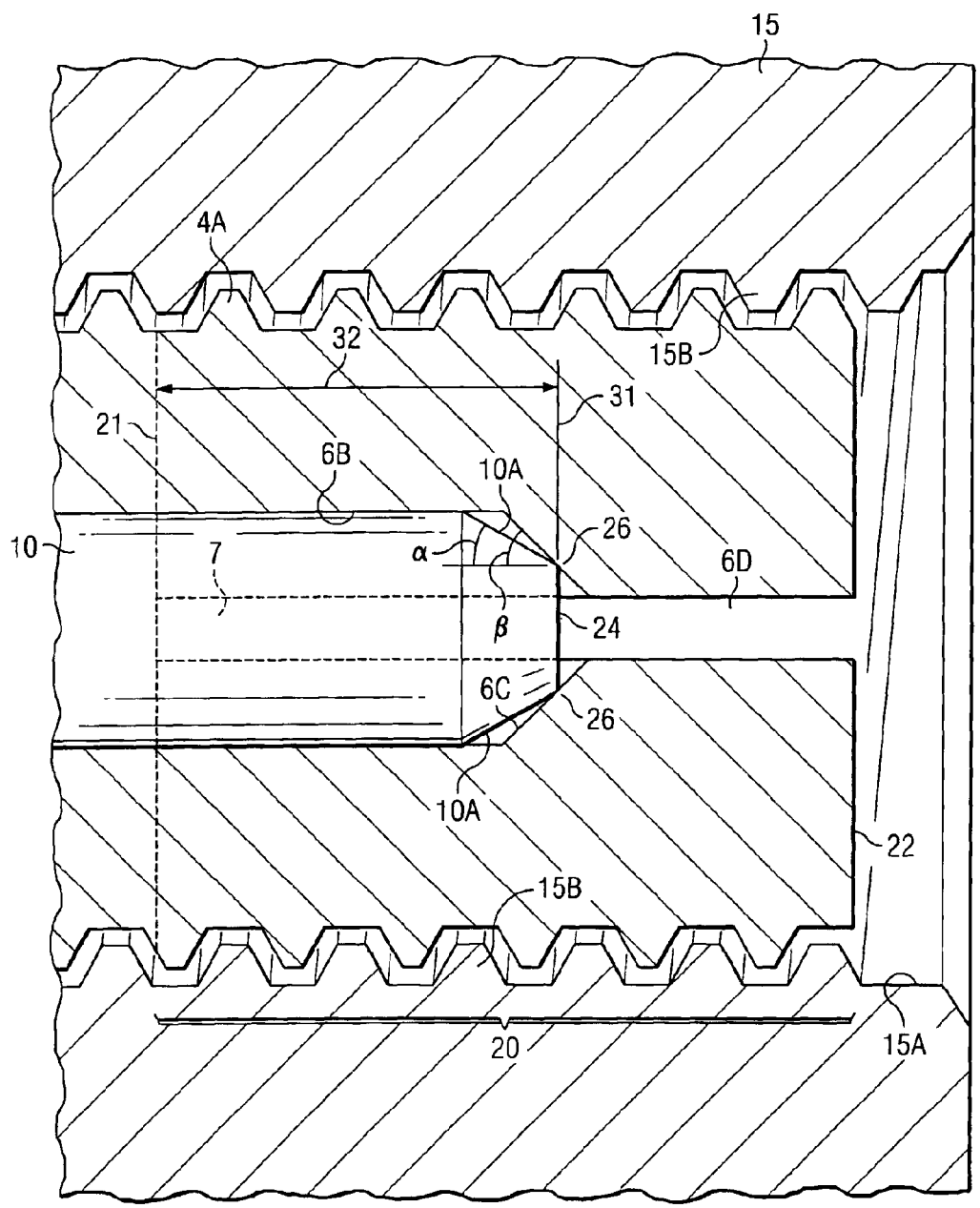
FIG. 5 is an enlarged view of the right portion of FIG. 4 marked to facilitate explanation of the operation of the split bolt and screw set pin assembly.
Figure 6:
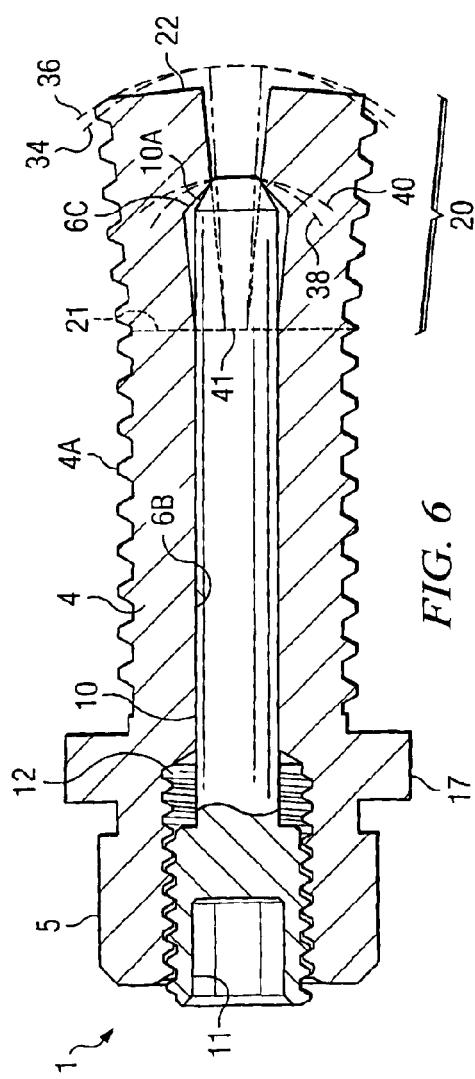
FIG. 6 is a diagram of the assembly as shown in the section view of FIG. 4 with the screw set pin sufficiently tightened to expand the split distal end portion of the split bolt.

Referring to FIGS. 4–6, split bolt 2 is threaded into a receiving hole 15A of a body 15 and screw set pin 3 is inserted into the proximal end portion 6A of bolt bore 6. When section 10B of screw set pin 3 is tightened enough that tapered section 10A of pin section 10 abuts the differently tapered section 6C of bolt bore 6 at a contact area 26 (that initially is generally annular), as shown in FIG. 4, the contact area 26 is positioned at the point indicated by dashed line 31 in FIG. 5. In this configuration as shown in FIG. 4, when the right end of tapered section 10A of screw set pin 3 first touches contact area 26 of tapered section 6C of bolt bore 6, the threads 12 in section 6A of bolt bore 6 extend substantially further to the right than the threads of section 10B. Consequently, the threads of section 10B do not ever gall into the unthreaded material of split bolt 2, as occurs in the previously described prior art.

Further tightening of screw set pin 3 forces tapered section 10A of screw set pin 3 further against and into tapered distal section 6C of bolt bore 6, thereby forcing expansion of the inner and outer diameter surfaces of the distal section 20 of split bolt 2, thereby wedging the bolt into and locking it into the threaded hole of the medial body 15. (The initially annular contact area 26 "evolves" into eight much smaller contact areas 26 as tapered section 10A of screw set pin 3 forces expansion of the slitted fingers 20D-1,2,3,4 of split bolt 2, as subsequently explained with reference to FIGS. 8A and 8B.)

It should be noted that the threads of the screw set pin should be as short as possible to keep the surface area of threaded contact to a minimum and reduce friction between the threads 10B of screw set pin 3 and the threads of a section 6A of bolt bore 6.

Unlocking of the split-lock bolt is very simple and reliable, as screw set pin 3 is simply un-tightened. That automatically loosens split bolt 2, and then it is easily adjusted within bolt-receiving hole 15A and can be re-tightened or removed from bolt-receiving hole 15A.

As shown in FIGS. 2, 4 and 5, the taper angle $\alpha$ of tapered section 10A screw set pin 3 is less than the taper angle $\beta$ of tapered section 6C of bolt bore 6. The incline or taper angle $\alpha$ of the tapered section 10A of screw set pin 3 being less than the incline or taper angle $\beta$ of tapered section 6C of bolt bore 6 prevents screw set pin 3 from "bottoming" or "heeling" on tapered section 6C bore 6, and instead causes the extreme end of tapered section 10A to apply a workforce to the most distal or distant portions of tapered section 6C. Thus, the distance 32 between contact area 26 and the beginning location 21 of slit 7 is significantly greater than would be the case if the two taper angles $\alpha$ and $\beta$ were equal. The increased distance 32 between the location 21 about which the fingers 20D-1,2,3,4 (FIG. 2) bend or "pivot" and the location of the contact area 26 increases the mechanical advantage for expanding fingers 20D-1,2,3,4 outwardly as screw set pin 3 is further tightened into bolt bore 6. The greater mechanical advantage is achieved in expanding the four fingers 20D-1,2,3,4 of split distal portion 20 of split bolt 2 by tightening screw set pin 3 because the described configuration provides the greatest distance 32 from the location 21 of the beginning of the slits 7 and the location 31 at which outward forces are applied to expand fingers 20D-1,2,3,4.

The incline angle $\alpha$ of tapered section 10A of screw set pin 3 being less than incline angle $\beta$ of the tapered section 6C of bolt bore 6 also provides a minimal amount of contact area 26 between screw set pin 3 and split bolt 2. This results in minimum surface friction between screw set pin 3 and split bolt 2 as screw set pin 3 is tightened into split bolt 2. The outward forces of fingers 20D-1,2,3,4 on the threads of bolt-receiving hole 15A act so as to lock split bolt 2 tightly into bolt-receiving hole 15A. The details of the locking mechanics of the screw set pin involved are subsequently explained with reference to FIGS. 8A and 8B. The inwardly directed forces of fingers 20D-1,2,3,4 on the reduced contact areas 26 between tapered sections 10A and 6C act so as to lock the tightened screw set pin 3 in place and prevent it from becoming loosened during mechanical vibration and/or thermal cycling of body 15 into which split bolt is threaded.

The above described locking split bolt/screw set pin assembly provides maximum outward pressure of the fingers of slotted distal portion of the split bolt which is relatively uniformly applied against the receiving hole 15A of the body 15 into which split bolt 2 is securely locked. Also, the contact area 26 between screw set pin 3 and fingers 20D-1,2,3,4 is reduced, and therefore causes high-pressure points to lock screw set pin 3 into place, as subsequently explained in more detail.

FIG. 6 shows screw set pin 3 sufficiently tightened into split bolt 2 to expand the split distal end portion of the split bolt. The outward radial component of force applied by tapered section 10A at the contact area 26 (FIG. 5) to tapered section 6C of bolt bore 6 causes the fingers of section 20 to expand outward as shown. In FIG. 6, arcs 34, 36, 38 and 40 are provided to show that the further screw set pin 3 is advanced into section 6C of bore 6, the greater the differential is between the two radii that determine the amount of contact area 26, and therefore the greater the reduction is in the amount of contact area 26, and therefore the greater the pressure is that increases the extent to which screw set pin 3 is locked into place.

Figure 7:
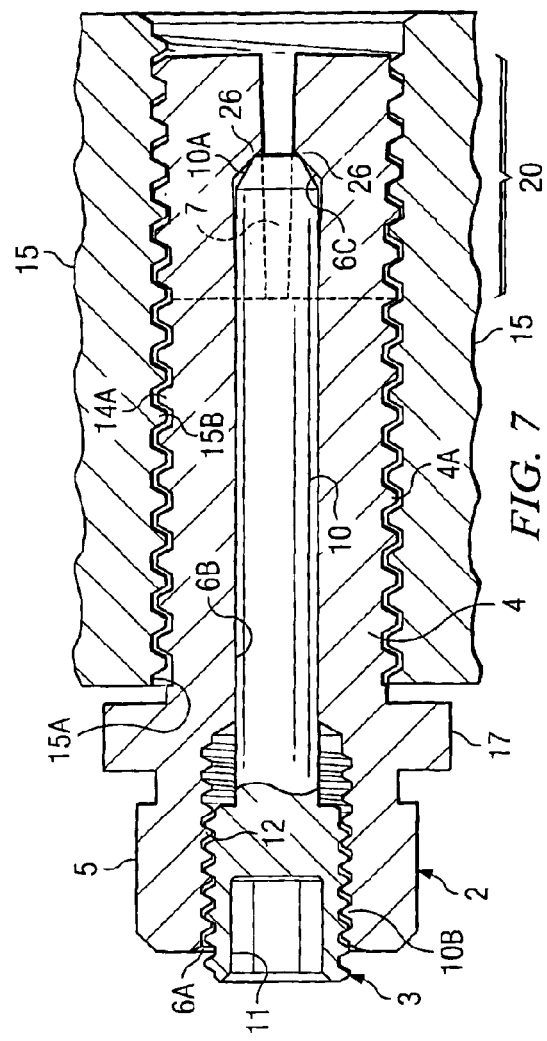
FIG. 7 is a diagram of the assembly as shown in FIG. 6 with the shank 4 of the split bolt 2 threaded into a body 15.

FIG. 7 shows expansion of the distal portion 20 of split bolt 2 as in FIG. 6, but with the shank 4 of the split bolt 2 threaded into bolt-receiving hole 15A of body 15, wherein the expanded threads of distal section 20 of split bolt 2 "fill up" the threads of bolt-receiving hole 15A much more tightly than is the case for the remaining threads 14A of split bolt 2.

Figure 8B:
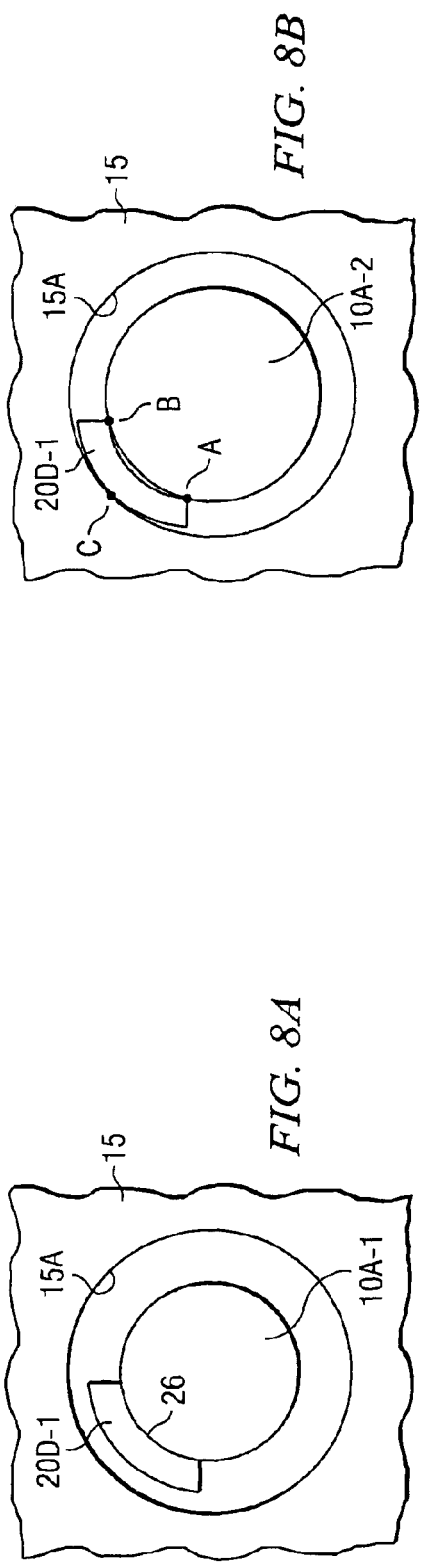
FIGS. 8A and 8B are partial section view diagrams that are useful in explaining the mechanism involved in the self-locking properties of the split bolt and screw set pin assembly of the present invention
Figure 8A:
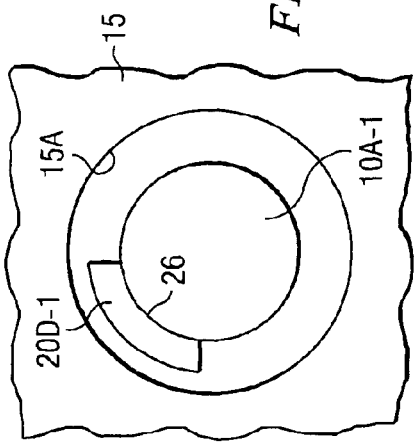

Referring to FIGS. 8A and 8B, note that the radius of curvature of the inner surfaces of fingers 20D-1,2,3,4 does not increase as the fingers are forced to expand outwardly. That is, the split fingers 20D-1,2,3,4 retain their original radii of curvature as they are expanded outward by the outward force of tapered distal end section 10A of screw set pin 3 upon tapered section 6C of bolt bore 6. In FIG. 8A, a section view is shown at the location at which a portion 10A-1 of tapered distal end section 10A of screw set pin 3 just uniformly touches the tapered section 6C of bolt bore 6, so the contact area 26 initially is generally annular. For simplicity, only finger 20D-1 is shown, and the uniform contact area between tapered distal end section 10A and finger 20D-1 is indicated by reference numeral 26 in FIG. 8A.

In FIG. 8B, another section view is shown after screw set pin 3 has been tightened so that its tapered distal end section 10A has expanded fingers 20D-1,2,3,4 so that the outer threads thereof are forced tightly into the inner threads of bolt-receiving hole 15A. Note that the radius of curvature of the threads of bolt-receiving hole 15A in body 15 is necessarily greater than the radii of curvature of the outer threads of the outwardly expanded finger 20D-1. Consequently, the contact area C between the inner threads of bolt-receiving hole 15A and the outer threads of finger 20D-1 is confined to the central area of the outer threads of finger 20D-1. This causes the contact area of the outer threads of finger 20D-1 to tend to dig into and elastically deform the threads 15B of body 15 in the contact area C. This causes the distal portion 20 of split bolt 2 to be very securely locked with respect to body 15.

FIG. 8B also shows that larger radius portion 10A-2 of tapered distal end section 10A contacts the inner surfaces of finger 20D-1, which has the same small radius of curvature as in FIG. 8A, which creates the small contact areas at points A and B, which represent portions of the reduced contact area 26. This causes the two contact areas of the endpoints of finger 20D-1 to tend to dig into, grip, and elastically deform the surface of tapered distal end section 10A of screw set pin 3 at the locations of the two contact areas A and B. This causes screw set pin 3 to be locked very securely with respect to split bolt 2.

An advantage of split bolt and screw set pin assembly 1 is that shank 4 of split-lock bolt 2 can be as long or large in diameter as desired for various applications, and can be easily locked at any selected depth in a threaded hole of a receiving object, by simply tightening the screw set pin. The selected depth can be easily readjusted at any time by simply loosening the screw set pin and turning the outer bolt to the desired depth and re-tightening the screw set pin.

Another important advantage of the above described split bolt and screw set pin assembly 1 in some applications is that the pressure or force of the bolt head or clamping flange of the split bolt upon a member being fastened to the receiving object is completely independent of how tightly the split-lock bolt is locked to the receiving object. Thus, a small clamping force may be provided on a soft or fragile member by the split-lock bolt, yet the split bolt 2 may be locked extremely tightly to the body 15.

It should be understood that the expansion of the locking threads 4A of split bolt 2 into the receiving threads 15B of receiving hole 15A effectively "fills up" the groove between the threads 15B of receiving hole 15 as shown in FIG. 7 when distal section 20 of split bolt 2 is maximally expanded by tightening of screw set pin 3 into split bolt 2. The filling of the groove results in the distal section 20 of split bolt 2 being essentially unitary with the body 15 and also results in minimal discontinuity in the boundary region between them so as to greatly reduce microscopic effects of vibration and/or thermal cycling which otherwise tend to induce loosening of split bolt 2 from threaded hole 15A in body 15.

For example, in high-performance internal combustion engines, the exhaust manifolds have always been bolted to the engine block, but until now there has been no good solution to the problem of the bolts eventually becoming loosened due to the extreme amount of vibration and thermal cycling to which they are subjected. The present inventors have proven that the above described split-lock bolt completely solves this problem.

Thus, the above described invention provides a screw set pin extending into the proximal end of a threaded bore extending through a split bolt having a reduced-diameter slotted distal end portion along with a small-diameter screw set pin so as to avoid galling of threads of the screw set pin and the bolt bore, and provides an angular relationship between taper of the distal end of the screw set pin and the tapered portion of the bolt bore that provides maximum mechanical advantage for tightening of the screw set pin to expand the distal slotted portion of the bolt to effectively lock it into the receiving hole, minimizes friction between the screw set pin and the bolt, and also locks the screw set pin into the bolt bore.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention. For example, slits 7 in the distal end section 20 of bolt 2 could be omitted in some cases if the outer bolt is composed of suitable material.

What is claimed is:

1. A self-locking bolt assembly comprising:
   (a) a bolt including a threaded shank, an axial bore extending through the shank, the bore including a threaded bore section, a tapered end section, and a bore midsection between the threaded bore section and the tapered end section;
   (b) a screw set pin including a screw section having threads for engaging the threaded bore section and a pin shaft having a tapered end section for engaging the tapered end section of the bore, the pin shaft having a proximal end attached to the screw section, the pin shaft being sufficiently long to ensure that when the tapered distal end section engages the tapered end section of the bore the screw set pin then can be screwed a predetermined distance further into the bore without galling threads of the screw section and the threaded bore section;

(c) said tapered end section of the pin shaft having a taper angle that is less than a taper angle of the tapered end section of the bore to allow a narrowed end portion of the tapered end section of the pin shaft to engage a narrowed end portion of the tapered end section of the bore; and (d) the distal end of the pin shaft having a larger diameter than the reduced diameter end section of the bore such that its periphery is adapted to engage the tapered end section of the bore.

2. The self-locking bolt assembly of claim 1 including a plurality of slits extending through a distal end section of the shank that includes the tapered end section of the bore.

3. The self-locking bolt assembly of claim 2 wherein the plurality of slits includes a pair of diametrically opposed slits.

4. The self-locking bolt assembly of claim 2 including a body having a threaded bolt-receiving hole therein, with the screw set pin tightened sufficiently into the bolt to cause the tapered end section of the pin shaft to sufficiently expand fingers defined by the slits that central contact areas of the fingers elastically deform and dig into the bolt-receiving hole enough to securely lock the bolt to the body.

5. The self-locking bolt assembly of claim 4 wherein edge contact areas of the fingers deform and dig into the tapered end section of the pin shaft enough to securely lock the screw set pin to the bolt.

6. The self-locking bolt assembly of claim 1 wherein a proximal end of the screw set pin includes a feature for applying torque to the screw set pin.

7. The self-locking bolt assembly of claim 6 wherein the torque-applying feature includes a key opening for receiving a torque-applying device.

8. The self-locking bolt assembly of claim 1 wherein the pin shaft has a diameter that is less than a diameter of the threaded bore section to allow the pin shaft to pass through the threaded bore section without engaging threads thereof.

9. The self-locking bolt assembly of claim 1 wherein the bolt includes a bolt head attached to the shank, and wherein the bore extends through the bolt head.

10. The self-locking bolt assembly of claim 1 including a body having a threaded bolt-receiving hole therein, with the screw set pin tightened sufficiently into the bolt to cause the tapered end section of the pin shaft to expand a distal end section of the shank enough that threads of the shank tightly engage threads of the bolt-receiving hole and become locked into the body.

11. A method of using a self-locking bolt assembly including a bolt including a threaded shank having an axial bore extending through the shank for receiving a screw set pin including a screw section having threads for engaging a threaded bore section of the bore, the screw set pin also including a tapered end section, the method comprising:

(a) providing a bore midsection between the threaded bore section and the tapered end section;

(b) providing a pin shaft having one end attached to the screw section and a tapered end section for engaging the tapered end section of the bore, the pin shaft being sufficiently long to ensure that when the tapered distal end section of the pin shaft engages the tapered end section of the bore the screw set pin then can be tightened a predetermined distance further into the bore without galling threads of the screw section and the threaded bore section;

(c) screwing the screw set pin sufficiently far into the bolt enough to abut the tapered end section of the pin shaft against the tapered end section of the bore, and causing only a narrowed end portion of the tapered end section of the pin shaft to engage a narrowed end portion of the tapered end section of the bore by providing the tapered end section of the pin shaft with a taper angle that is less than a taper angle of the tapered end section of the bore;

(d) providing a plurality of slits extending through a distal end section of the shank including the tapered end section of the bore; and (e) tightening the screw set pin sufficiently far into the bolt that edge contact areas of the fingers deform and dig into the tapered end section of the pin shaft enough to securely lock the screw set pin to the bolt.

12. A self-locking bolt assembly, for locking the assembly in a threaded bolt-receiving hole, comprising:

(a) a bolt including a threaded shank, an axial bore extending through the shank, the bore including a threaded bore section, a tapered end section, and a bore midsection between the threaded bore section and the tapered end section and a reduced diameter end section extending from the tapered end section;

(b) a screw set pin including a screw section having threads for engaging the threaded bore section and a pm shaft having a tapered end section for engaging the tapered end section of the bore, the pin shaft having a proximal end attached to the screw section, the pin shaft being sufficiently long to ensure that when the tapered distal end section engages the tapered end section of the bore the screw set pin then can be screwed a predetermined distance further into the bore without galling threads of the screw section and the threaded bore section;

(c) said tapered end section of the pin shaft having a taper angle that is less than a taper angle of the tapered end section of the bore to allow a narrowed end portion of the tapered end section of the pin shaft to engage a narrowed end portion of the tapered end section of the bore;

(d) the distal end of the pin shaft having a larger diameter than the reduced diameter end section of the bore such that its periphery is adapted to engage the tapered end section of the bore;

(e) a plurality of slits extending through a distal end section of the shank that includes the tapered end section of the bore; and (f) differential radius means for locking the self-locking bolt assembly into the threaded bolt-receiving hole in a body by tightening the screw set pin sufficiently far into the bolt to cause the tapered end section of the pin shaft to sufficiently expand fingers defined by the slits that central contact areas of the fingers elastically deform and dig into the bolt-receiving hole enough to securely lock the bolt to the body and to cause edge contact areas of the fingers to deform and dig into the tapered end section of the pin shaft enough to securely lock the screw set pin to the bolt.

13. A method of using a self-locking bolt assembly, for locking the bolt in a threaded bolt-receiving hole, including a bolt including a threaded shank having an axial bore extending through the shank for receiving a screw set pin including a screw section having threads for engaging a threaded bore section of the bore, the screw set pin also including a tapered end section, the method comprising:

(a) providing a bore midsection between the threaded bore section and a tapered end section and a plurality of slits extending through a distal end section of the shank that includes the tapered end section of the bore;

(b) providing a pin shaft having one end attached to the screw section and a tapered end section for engaging the tapered end section of the bore, the pin shaft being sufficiently long to ensure that when the tapered distal end section of the pin shaft engages the tapered end section of the bore the screw set pin then can be tightened a predetermined distance further into the bore without galling threads of the screw section and the threaded bore section;

(c) screwing the screw set pin sufficiently far into the bolt enough to abut the tapered end section of the pin shaft against the tapered end section of the bore, and causing only a narrowed end portion of the tapered end section of the pin shaft to engage a narrowed end portion of the tapered end section of the bore by providing the tapered end section of the pin shaft with a taper angle that is less than a taper angle of the tapered end section of the bore; and (d) providing differential radius means for locking the self-locking bolt assembly into a threaded bolt-receiving hole in a body by tightening the screw set pin sufficiently far into the bolt to cause the tapered end section of the pin shaft to sufficiently expand fingers defined by the slits that central contact areas of the fingers elastically deform and dig into the bolt-receiving hole enough to securely lock the bolt to the body and to cause edge contact areas of the fingers to deform and dig into the tapered end section of the pin shaft enough to securely lock the screw set pin to the bolt.

14. A self-locking bolt assembly comprising:

(a) a bolt including a threaded shank, an axial bore extending through the shank, the bore including a threaded bore section, a tapered end section, a bore midsection between the threaded bore section and the tapered end section, and a reduced diameter end section extending from the tapered end section;

(b) a screw set pin including a screw section having threads for engaging the threaded bore section and a pin shaft having a tapered end section for engaging the tapered end section of the bore, the pin shaft having a proximal end attached to the screw section, the pin shaft being sufficiently long to ensure that when the tapered distal end section engages the tapered end section of the bore the screw set pin then can be screwed a predetermined distance further into the bore without galling threads of the screw section and the threaded bore section;

(c) said tapered end section of the pin shaft having a taper angle that is less than a taper angle of the tapered end section of the bore to allow a narrowed end portion of the tapered end section of the pin shaft to engage a narrowed end portion of the tapered end section of the bore;

(d) the distal end of the pin shaft having a larger diameter than the reduced diameter end section of the bore such that its periphery is adapted to engage the tapered end section of the bore; and (e) means for locking the set screw pin to the bolt when a tapered end section of the pin shaft engages the tapered end section of the bore.

* * * * *